(12) United States Patent
Otake et al.

(10) Patent No.: US 8,575,859 B2
(45) Date of Patent: *Nov. 5, 2013

(54) ILLUMINATING DEVICE

(75) Inventors: Hirokazu Otake, Yokosuka (JP);
Toshiyuki Hiraoka, Numazu (JP);
Keiichi Shimizu, Yokohama (JP); Nobuo Shibano, Miura (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,555

(22) Filed: Aug. 31, 2012

(65) Prior Publication Data

US 2012/0319613 A1     Dec. 20, 2012

Related U.S. Application Data

(63) Continuation of application No. 13/234,379, filed on Sep. 16, 2011, which is a continuation of application No. 13/037,534, filed on Mar. 1, 2011, now Pat. No. 8,188,680, which is a continuation of application No. 12/129,939, filed on May 30, 2008, now Pat. No. 7,952,295.

(30) Foreign Application Priority Data

May 31, 2007  (JP) ................................. 2007-145326

(51) Int. Cl.
*H05B 37/02* (2006.01)

(52) U.S. Cl.
USPC ............................ 315/294; 315/224; 315/247

(58) Field of Classification Search
USPC ............. 315/185 R, 224, 225, 247, 291, 294, 315/297, 307, 312
See application file for complete search history.

(56) References Cited

U.S. PATENT DOCUMENTS

| 4,329,625 A | 5/1982 | Nishizawa et al. |
| 5,128,595 A | 7/1992 | Hara |
| 5,644,328 A * | 7/1997 | Rhyne et al. ..................... 345/82 |
| 6,051,935 A | 4/2000 | Bucks et al. |
| 6,400,102 B1 | 6/2002 | Ghanem |
| 6,515,434 B1 * | 2/2003 | Biebl ............................ 315/291 |

(Continued)

FOREIGN PATENT DOCUMENTS

| CN | 1606221 A | 4/2005 |
| JP | 11068161 A | 3/1999 |

(Continued)

OTHER PUBLICATIONS

Notice of Allowance issued in related U.S. Appl. No. 13/234,438 dated Jan. 7, 2013.
Notice of Allowance issued in related U.S. Appl. No. 13/445,124 Dated Jan. 28, 2013.

(Continued)

*Primary Examiner* — Tung X Le
(74) *Attorney, Agent, or Firm* — Banner & Witcoff, Ltd.

(57) ABSTRACT

To a constant-current power supply whose output current can be variably set, light emitting modules can be connected in parallel. A control unit recognizes connection information outputted from an information output unit provided in each of the light emitting modules and varies the output current of the constant-current power supply. Drive can be controlled in response to a state of the connected light emitting modules such as the connecting number of light emitting modules.

14 Claims, 7 Drawing Sheets

(56) References Cited

U.S. PATENT DOCUMENTS

| | | | |
|---|---|---|---|
| 6,538,394 B2 | 3/2003 | Volk et al. | |
| 7,071,630 B1 | 7/2006 | York | |
| 7,122,971 B2 | 10/2006 | Yeh et al. | |
| 7,276,861 B1 | 10/2007 | Shteynberg et al. | |
| 7,352,138 B2 | 4/2008 | Lys et al. | |
| 7,436,378 B2 | 10/2008 | Ito et al. | |
| 7,508,141 B2 | 3/2009 | Wong | |
| 7,528,551 B2 * | 5/2009 | Ball | 315/247 |
| 7,583,035 B2 | 9/2009 | Shteynberg et al. | |
| 7,598,682 B2 | 10/2009 | Grajcar | |
| 7,633,245 B2 | 12/2009 | Pruett | |
| 7,821,237 B2 * | 10/2010 | Melanson | 323/222 |
| 7,852,009 B2 | 12/2010 | Coleman et al. | |
| 7,852,010 B2 | 12/2010 | Negley | |
| 7,888,881 B2 * | 2/2011 | Shteynberg et al. | 315/291 |
| 7,952,295 B2 | 5/2011 | Otake et al. | |
| 8,026,673 B2 | 9/2011 | Lys | |
| 8,134,310 B2 | 3/2012 | Wacknov et al. | |
| 2002/0158590 A1 | 10/2002 | Saito et al. | |
| 2005/0082989 A1 | 4/2005 | Jones et al. | |
| 2005/0127883 A1 | 6/2005 | Hoshino et al. | |
| 2006/0017402 A1 | 1/2006 | McKinney et al. | |
| 2006/0039146 A1 | 2/2006 | Wu | |
| 2006/0256050 A1 | 11/2006 | Ikeda | |
| 2007/0013620 A1 | 1/2007 | Tanahashi et al. | |
| 2008/0100232 A1 | 5/2008 | Miguchi | |
| 2008/0129220 A1 | 6/2008 | Shteynberg et al. | |
| 2008/0238340 A1 | 10/2008 | Leung et al. | |
| 2008/0258695 A1 | 10/2008 | Kumar et al. | |
| 2010/0033095 A1 | 2/2010 | Sadwick | |

FOREIGN PATENT DOCUMENTS

| | | |
|---|---|---|
| JP | 2002008409 A | 1/2002 |
| JP | 2007027316 A | 2/2007 |
| JP | 2007096287 A | 4/2007 |

OTHER PUBLICATIONS

Ex Parte Quayle issued in related U.S. Appl. No. 13/234,379 dated Nov. 19, 2012.
Non-Final office action issued in related U.S. Appl. No. 13/037,534 mailed Jul. 18, 2011.
Non-Final office action issued in related U.S. Appl. No. 13/234,379 mailed Feb. 24, 2012.
Final Office action issued in related U.S. Appl. No. 13/234,379 mailed Jul. 30, 2012.
Final Office action issued in related U.S. Appl. No. 13/037,534 mailed Nov. 21, 2011.
Notice of Allowance issued in related U.S. Appl. No. 13/037,534 mailed Jan. 25, 2012.
Non-Final office action issued in related U.S. Appl. No. 13/234,438 mailed Mar. 6, 2012.
Notice of Allowance issued in related U.S. Appl. No. 13/234,438 mailed Aug. 21, 2012.
Non-Final office action issued in related U.S. Appl. No. 13/445,124 mailed May 22, 2012.
Notice of Allowance issued in related U.S. Appl. No. 13/445,124 mailed Oct. 18, 2012.
Non-Final office action issued in related U.S. Appl. No. 13/600,593 mailed Oct. 3, 2012.
Non-Final office action issued in related U.S. Appl. No. 12/129,939 mailed Mar. 17, 2010.
Notice of Allowance issued in related U.S. Appl. No. 12/129,939 mailed Mar. 8, 2011.
Final Office action issued in related U.S. Appl. No. 12/129,939 mailed Nov. 23, 2010.
Final Office Action received in corresponding U.S. Appl. No. 13/600,593 mailed Apr. 2, 2013.
Notice of Allowance received in corresponding U.S. Appl. No. 13/234,379 mailed Apr. 1, 2013.
Notice of Allowance issued in corresponding U.S. Appl. No. 13/600,593, mailed Jul. 15, 2013.

* cited by examiner

ILLUMINATING DEVICE

INCORPORATION BY REFERENCE

The present application in a continuation of U.S. patent application Ser. No. 13/234,379 filed Sep. 16, 2011 entitled "Illuminating Device and Controlling Method Thereof" which is a continuation of U.S. patent application Ser. No. 13/037,534 filed on Mar. 1, 2011, issued as U.S. Pat. No. 8,188,680, which is a continuation of U.S. patent application Ser. No. 12/129,939 filed on May 30, 2008, issued as U.S. Pat. No. 7,952,295, which claims priority under 35 U.S.C. §119 to Japanese Patent Application No. 2007-145326 filed on May 31, 2007. The content of all of the applications is incorporated herein by reference in its entirety.

TECHNICAL FIELD

The present invention relates to an illuminating device for which light emitting modules each including either one light source or a plurality of light sources connected in series can be connected in parallel with each other.

BACKGROUND

Conventionally, there is an illuminating device for which a plurality of LED modules being light emitting modules for each of which a plurality of light emitting diodes (LEDs) are connected in series can be connected as light sources in parallel to a power supply. In such an illuminating device, in order to light the LEDs of each light emitting module almost uniformly, the power supply is provided as a constant-current power supply to supply a constant current to the light emitting module.

However, in the above-described illuminating device, since the power supply is provided as a constant-current power supply, this is effective when the connecting number of LED modules is preset, while in such a case where the connecting number of LED modules is arbitrarily increased or decreased, there is a problem that drive cannot be controlled in response to a state of the connected LED modules, such that current to be supplied to each LED module is insufficient or excessive, and the LEDs cannot be lit in a desired state.

The present invention has been made in view of such a problem, and an object thereof is to provide an illuminating device whose drive can be controlled in response to a state of the connected light emitting modules.

DETAILED DESCRIPTION

Figure 1:
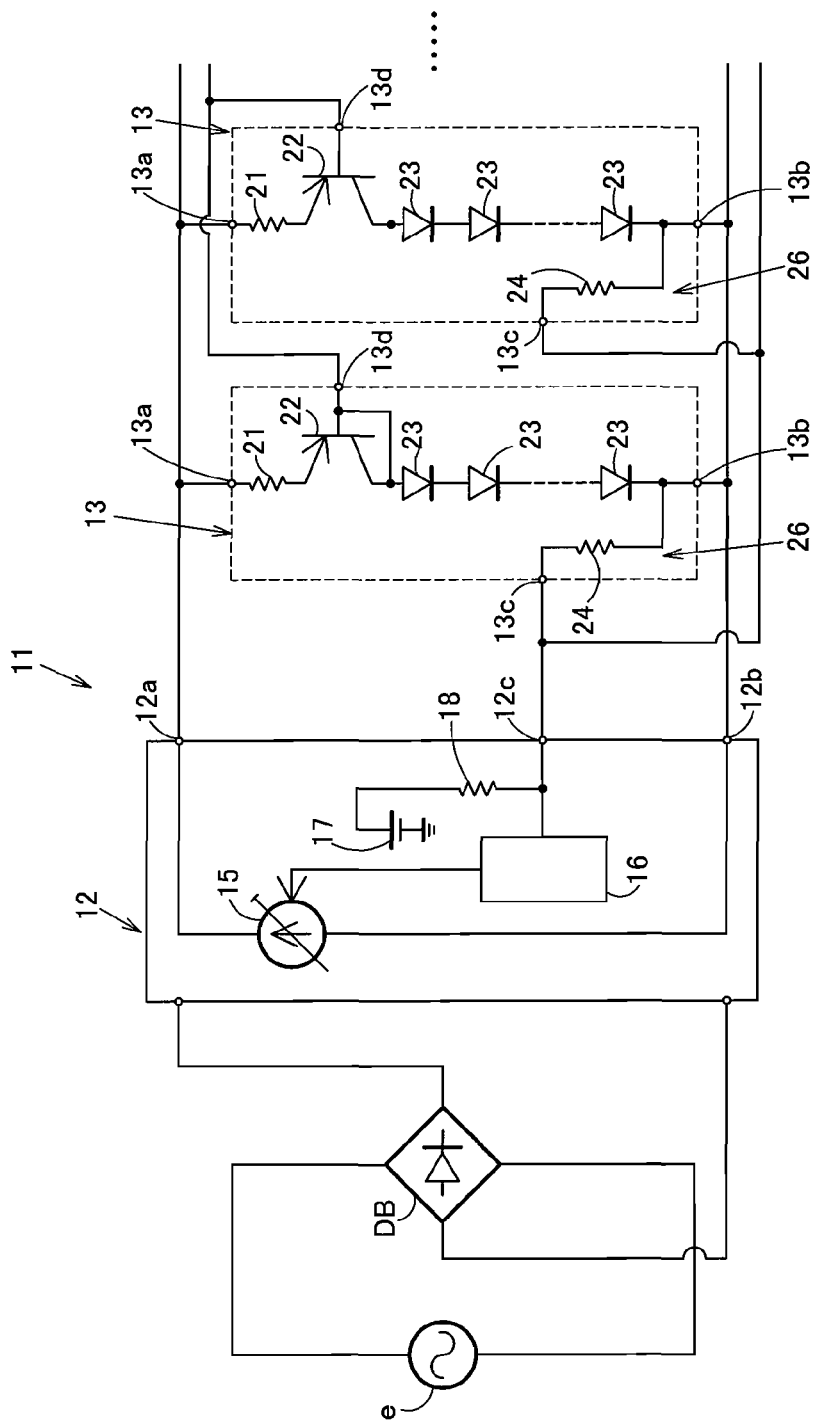
FIG. 1 is a circuit diagram of an illuminating device showing a first embodiment of the present invention.

Aspects described herein relate to a constant-current power supply whose output current can be variably set; a light emitting module including paired main terminals that can be connected to this constant-current power supply and one or more light sources connected between these paired main terminals; an information output unit that is provided in this light emitting module and that outputs connection information of this light emitting module; and a control unit that recognizes the connection information outputted from this information output unit and varies the output current of the constant-current power supply.

The light source is preferably, for example, an LED but is not limited to an LED.

The light emitting module is, for example, a unit for which one or more light sources are disposed with a predetermined arrangement.

The information output unit is, for example, a resistor, a microcomputer, or the like, which outputs a connecting state of each individual light emitting module.

The control unit is, for example, a microcomputer, or the like provided in the constant-current power supply.

And, as a result of the control unit recognizing the connection information outputted from the information output unit provided in each of the light emitting modules and varying the output current of the constant power supply, drive can be controlled in response to a state of the connected light emitting modules, for example, the connecting number of light emitting modules.

Moreover, according to various aspects, the information output unit outputs the connection information by at least either of the main terminals of the light emitting module.

And, as a result of using at least either of the main terminals of the light emitting module also for output of the information output unit, the configuration can be simplified in comparison with when a terminal for outputting information or the like is separately provided.

Moreover, according to further aspects, the information output unit includes a resistor connected between the main terminals of the light emitting module, and the control unit recognizes a current that flows to the resistor when a voltage given between the main terminals by the constant-current power supply is lower than a voltage at which the light source emits light in a predetermined state as the connection information of the light emitting module.

And, as a result of the control unit recognizing a current that flows to the resistor when a voltage between the main terminals is lower than a voltage at which the light source emits light in a predetermined state as the connection information of the light emitting module, the main terminal of the light emitting module can be easily used also as the information output unit.

Moreover, according to some aspects, timing where the control unit recognizes the connection information of the light emitting module is at start-up before the light source is lit.

And, as a result of the control unit recognizing the connection information of the light emitting module at start-up before the light source is lit, no time for recognizing the connection information of the light emitting module is separately required, so that usability is improved.

Moreover, according to other aspects, the information output unit includes a resistor connected between the main terminals of the light emitting module, the constant-current power supply controls the output current by PWM control, and the control unit recognizes a current that flows to the resistor due to a voltage generated in an OFF period of the PWM control of the constant-current power supply between the main terminals of the light emitting module as the connection information of the light emitting module.

And, as a result of the control unit recognizing a current that flows to the resistor due to a voltage generated in an OFF period of the PWM control of the constant-current power supply as the connection information of the light emitting module, the main terminal of the light emitting module can be easily used also as the information output unit.

Hereinafter, an embodiment will be described with reference to the drawings.

A first embodiment is shown in FIG. 1, and FIG. 1 is a circuit diagram of an illuminating device.

As shown in FIG. 1, for an LED lighting device 11 being an illuminating device, connected to a constant-current power supply 12 is one or a plurality of light emitting modules 13 in parallel with each other.

The constant-current power supply 12 is connected to a commercial alternating current power supply "e" via a diode bridge DB being a rectifying unit. Moreover, this constant-current power supply 12 has output terminals 12a and 12b connected to main terminals 13a and 13b of the light emitting module 13, respectively, and an input terminal 12c to which connection information outputted from the respective light emitting modules 13 are inputted and has, between the output terminals 12a and 12b, for example, a semi-fixed variable constant-current source 15 whose output current $I_L$ can be variably set.

A control unit 16 of this is, for example, a microcomputer or the like, which is connected to the input terminal 12c to recognize the connection information from the respective light emitting modules 13 and set an output current from the variable constant-current source 15 (constant-current power supply 12). Moreover, between this control unit 16 and the input terminal 12c, a direct-current power supply 17 being a constant-voltage source is connected via a resistor 18.

For each light emitting module 13, between the main terminals 13a and 13b, a resistor 21, a transistor 22 serving as a switching element, and one or a plurality of LEDs 23 being a light source or light sources are connected in series to each other, and an information output resistor 24 for outputting connection information is connected between the LED 23 and the main terminal 13b, and this information output resistor 24 is connected to an information output terminal 13c.

The transistor 22 is, for example, a PNP-type bipolar transistor, whose emitter being an output terminal is connected to the resistor 21, whereby an emitter potential is set, and whose collector being an input terminal is connected to the LED 23. Moreover, in the transistor 22 of the first light emitting module 13 connected to the constant-current power supply 12, the emitter is connected to the base being a control terminal. And, the bases of the transistors 22 of the respective light emitting modules 13 are connected to each other via an output terminal 13d of the light emitting module 13, and base potentials of the transistors 22 of the respective light emitting modules 13 are set to the same potential as each other. Accordingly, these transistors 22 form a leveling circuit, so that lighting currents of the LEDs 23 that flow to all light emitting modules 13 become the same current.

The respective information output resistors 24 are set to almost equal resistances to each other, and connected in parallel with each other between the information output terminals 13c. Accordingly, these respective information output resistors 24 are connected to the direct-current power supply 17 in parallel with each other. And, the information output resistors 24 and the information output terminals 13c form information output units 26.

Next, operations of the present embodiment will be described.

When a predetermined output current $I_L$ is outputted between the output terminals 12a and 12b from the variable constant-current source 15 of the constant-current power supply 12, lighting currents flow to the respective light emitting modules 13 connected in parallel to the constant-current power supply 12 and the respective LEDs 23 emit light.

At this time, the lighting currents of the respective light emitting modules 13 are set almost equal to each other by a leveling effect of the respective transistors 22. That is, the lighting currents of the respective light emitting modules 13 are equal to currents obtained by equally dividing the output current $I_L$ by the number of light emitting modules 13, so that the LEDs 23 of the respective light emitting modules 13 emit light almost uniformly.

On the other hand, in the constant-current power supply 12, since the number of information output resistors 24 to be connected in parallel to the direct-current power supply 17 differs depending on the number of connected light emitting modules 13, potential at a position between the resistor 18 and the input terminal 12c connected to the control unit 16 is changed. More specifically, when the connecting number of the light emitting modules 13 is increased or decreased, the number of information output resistors 24 connected in parallel with each other is increased or decreased, and thus all resistances on the side of these information output resistors 24 are decreased or increased in inverse proportion, and potential at a position between the resistor 18 and the input terminal 12c is lowered or raised.

Then, the control unit 16 reads this potential to thereby recognize the connection information of the light emitting modules 13, here, the connecting number, and thus, in response to this recognized connecting number, the output current $I_L$ to be supplied from the variable constant-current source 15 is varied.

As such, the control unit 16 varies the output current $I_L$ of the constant-current power supply 12 in response to connection information outputted from the information output unit 26 provided in each of the light emitting modules 13, here, the connecting number of light emitting modules 13, whereby drive of the LED lighting device 11 can be controlled in response to a state of the connected light emitting modules 13.

Moreover, by forming the information output unit 26 of the information output resistor 24 and the information output terminal 13c, the information output unit 26 can be easily formed in each light emitting module 13, whereby complication of the configuration of the light emitting module 13 can be prevented.

Figure 2:
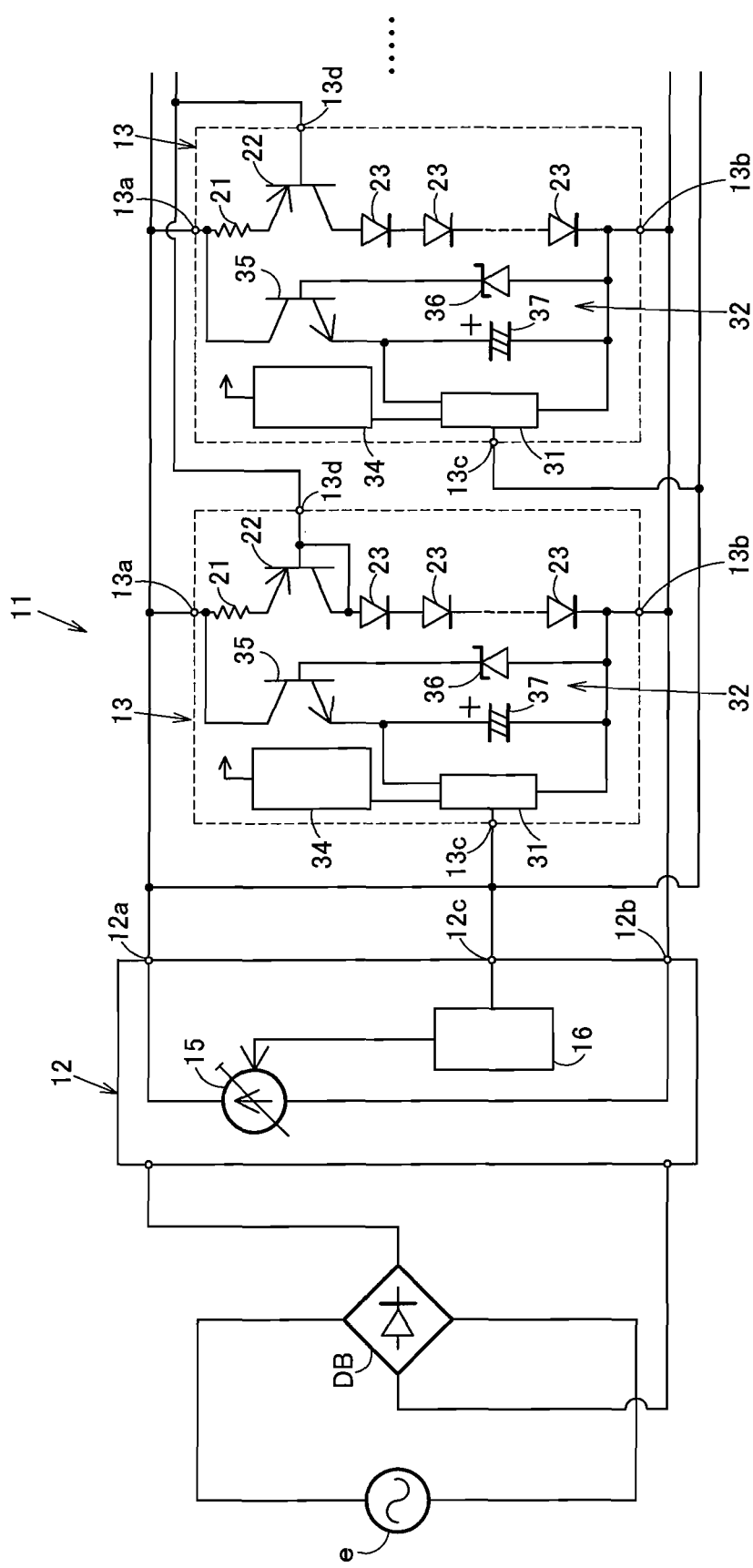
FIG. 2 is a circuit diagram of an illuminating device showing a second embodiment of the present invention.

Next, a second embodiment is shown in FIG. 2, and FIG. 2 is a circuit diagram of an illuminating device. Also, the same configurations and operations as those of the abovementioned first embodiment will be denoted with identical reference numerals, and descriptions thereof will be omitted.

In the second embodiment, in place of the information output resistors 24 of the respective light emitting modules 13 of the abovementioned first embodiment, microcomputers 31 which are storing units serving as information units are connected via power supply circuits 32, respectively, whereby the information output units 26 are formed.

Each microcomputer 31 detects an abnormality of the LED 23 of the light emitting module 13 and the like via a load abnormality detecting unit 34. And, each microcomputer 31 stores, as connection information of the light emitting modules 13, specifications and the number of the light emitting module: 13, the accumulated lighting time in the light emitting module 13, load abnormality information outputted from the load abnormality detecting unit 34, and the like in a built-in unillustrated memory or the like.

Moreover, the power supply circuit 32, which supplies power to the microcomputer 31, has a transistor 35 connected, to the main terminal 13a, in parallel with the resistor 21 and a Zener diode 36 and a capacitor 37 connected to the transistor 35.

The transistor 35 is, for example, an NPN type bipolar transistor, whose collector is connected in parallel with the resistor 21, whose base is connected to a cathode side of the Zener diode 36, and whose emitter is connected to a plus side of the capacitor 37.

The Zener diode 36 sets a base potential of the transistor 35, an anode side thereof is grounded via the main terminal 13b.

The capacitor 37, which charges electricity to be supplied to each microcomputer 31, is, for example, a large-capacity capacitor such as an electrolytic capacitor, and a plus side and a minus side thereof are connected to the microcomputer 31, respectively, and the minus side is grounded via the main terminal 13b.

And, in each light emitting module 13, most of the lighting current supplied from the constant-current power supply 12 flows to the LED 23 via the resistor 21 and the transistor 22, and by a leveling effect of the resistors 21 and the transistors 22, the LEDs 23 are lit almost uniformly in all light emitting modules 13. Simultaneously, part of the lighting current is charged in the capacitor 37 by an effect of the transistor 35 so that power is supplied to the microcomputer 31, and various types of connection information are outputted from this microcomputer 31 to the control unit 16. Also, the capacitor 37 can be charged up to a voltage almost equal to a breakdown voltage of the Zener diode 36.

Furthermore, in the control unit 16, operation of the constant-current power supply 12 is controlled based on the connection information outputted from the microcomputers 31 of the respective light emitting modules 13, whereby drive of the LED lighting device 11 is controlled.

More specifically, the control unit 16 can control drive of the LED lighting device 11 in response to a state of the connected light emitting modules 13 by, for example, increasing or decreasing the output current $I_L$ to be supplied from the variable constant-current source 15 according to the specifications and the number of the light emitting modules 13 outputted from the microcomputer 31, stopping drive of the LED lighting device 11 when the accumulated lighting time of the light emitting module 13 outputted from the microcomputer 31 is larger than a predetermined time previously set, and performing a protective operation, such as limiting the output current $I_L$ or stopping drive of the LED lighting device 11, when a load abnormality such as, for example, opening or short-circuiting of the LED 23 has occurred as load abnormality information outputted from the microcomputer 31.

Moreover, the information output 26 including the microcomputer 31 allows storing various connection information of the light emitting modules 13 in the microcomputer 31, and thus in response to these connection information, drive of the light emitting module 13 can be variously controlled.

Figure 3:
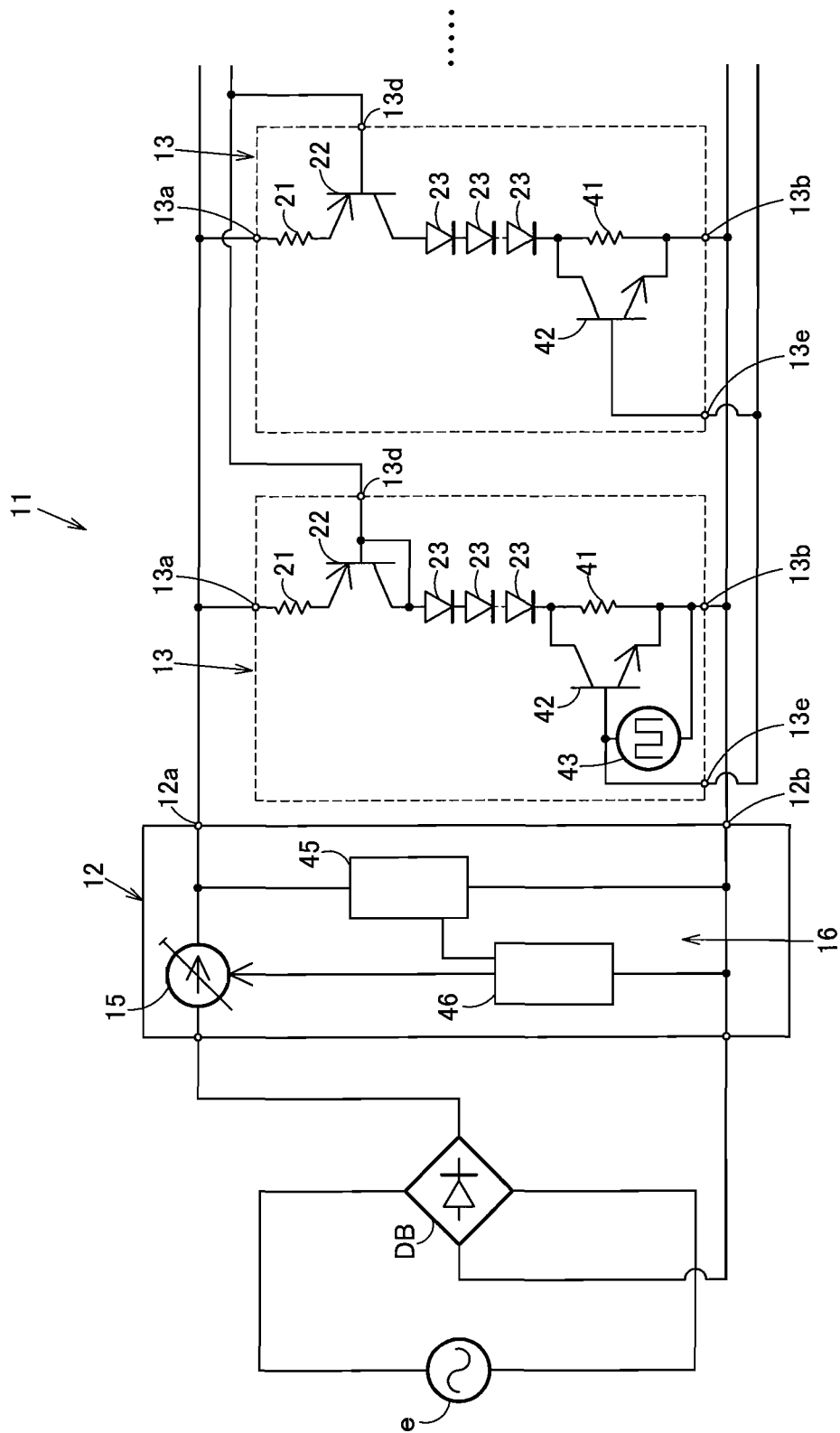
FIG. 3 is a circuit diagram of an illuminating device showing a third embodiment of the present invention.
Figure 4:
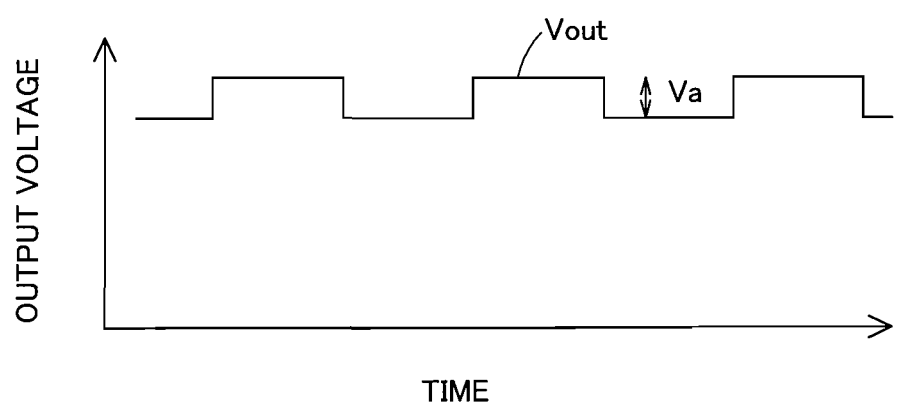
FIG. 4 is a graph showing an output voltage of a constant-current power supply of the illuminating device.

Next, a third embodiment is shown in FIG. 3 and FIG. 4, wherein FIG. 3 is a circuit diagram of an illuminating device, and FIG. 4 is a graph showing an output voltage of a constant-current power supply of the illuminating device. Also, the same configurations and operations as those of the abovementioned second embodiment will be denoted with identical reference numerals, and descriptions thereof will be omitted.

For the third embodiment, a parallel circuit of a resistor 41 and a transistor 42 serving as an information unit is connected between the LED 23 and the main terminal 13b in the abovementioned embodiment.

The transistor 42 is, for example, an NPN-type bipolar transistor, whose collector is connected to the LED 23 side and whose emitter is grounded via the main terminal 13b, and the resistor 41 is connected between the collector and emitter. Moreover, between the base and emitter of the transistor 42 of the first light emitting module 13 connected to the constant current power supply 12, a pulse power supply 43 is connected, and the resistor 41, the transistor 42, and the pulse power supply 43 form the information output unit 26. And, the pulse power supply 43 is connected via a connection terminal 13e to the bases of the transistors 42 of all other light emitting modules 13.

Moreover, in the constant-current power supply 12, provided is an output voltage detecting unit 45 that detects an output voltage Vout between the output terminals 12a and 12b and a load fitting state discriminating unit 46 that discriminates a state of the light emitting module 13 based on the output voltage Vout and the like detected by the output voltage detecting unit 45, and the output voltage detecting unit 45 and the load fitting state discriminating unit 46 form the control unit 16.

And, in each light emitting module 13, the lighting current supplied from the constant-current power supply 12 flows to the LED 23 via the resistor 21 and the transistor 22, and by a leveling effect of the resistors 21 and the transistors 22, the LEDs 23 are lit almost uniformly in all light emitting modules 13.

Furthermore, in the information output unit 26, as a result of a pulse voltage being applied between the base and emitter of the transistor 42 at a duty ratio or a frequency set for each type of the light emitting module 13 from the pulse power supply 43, this transistor 42 repeats turning on and off in predetermined periods, so that a potential difference (collector-emitter voltage of the transistor 42) between both ends of the resistor 41 is periodically reduced. Therefore, the voltage between the main terminals 13a and 13b of the light emitting module 13, that is, the output voltage Vout of the constant-current power supply 12 is periodically reduced by, for example, a voltage Va, as shown in FIG. 4.

Accordingly, as a result of the output voltage detecting unit 45 detecting a frequency of increases/decreases in the output voltage Vout, the load fitting state discriminating unit 46 detects the type of the connected light emitting module 13, and in response to the type of the light emitting module 13 thus detected, the load fitting state discriminating unit 46 sets the output current $I_L$ from the variable constant-current source 15.

Moreover, when the connecting number of light-emitting modules 13 is increased, a supply current to each transistor 42 connected in parallel to the pulse power supply 43 is decreased, whereby a potential difference between both ends of the resistor 41 of each light emitting module 13 is decreased in inverse proportion, so that the voltage Va in the output voltage Vout of the constant-current power supply 12 is increased.

Accordingly, as a result of detecting the size of this voltage Va, that is, the amplitude of the output voltage Vout by the output voltage detecting unit 45, it becomes possible for the load fitting state discriminating unit 46 to detect the connecting number of the light emitting modules 13, and in response to the connecting number of the light emitting modules 13 thus detected, the load fitting state discriminating unit 46 sets the output current I$_L$ from the variable constant-current source 15.

As such, according to the abovementioned third embodiment, the control unit 16 varies the output current I$_L$ of the constant-current power supply 12 in response to the connection information outputted from the information output unit 26 provided in each of the light emitting modules 13, here, the type or the connecting number of light emitting modules 13, drive of the LED lighting device 11 can be controlled in response to a state of the connected light emitting modules 13.

Moreover, for the information output unit 26, by using the main terminals 13a and 13b that supply electricity from the constant-current power supply 12 also for outputting the connection information, the configuration can be simplified in comparison with that when information outputting terminals or the like are separately provided.

Figure 5:
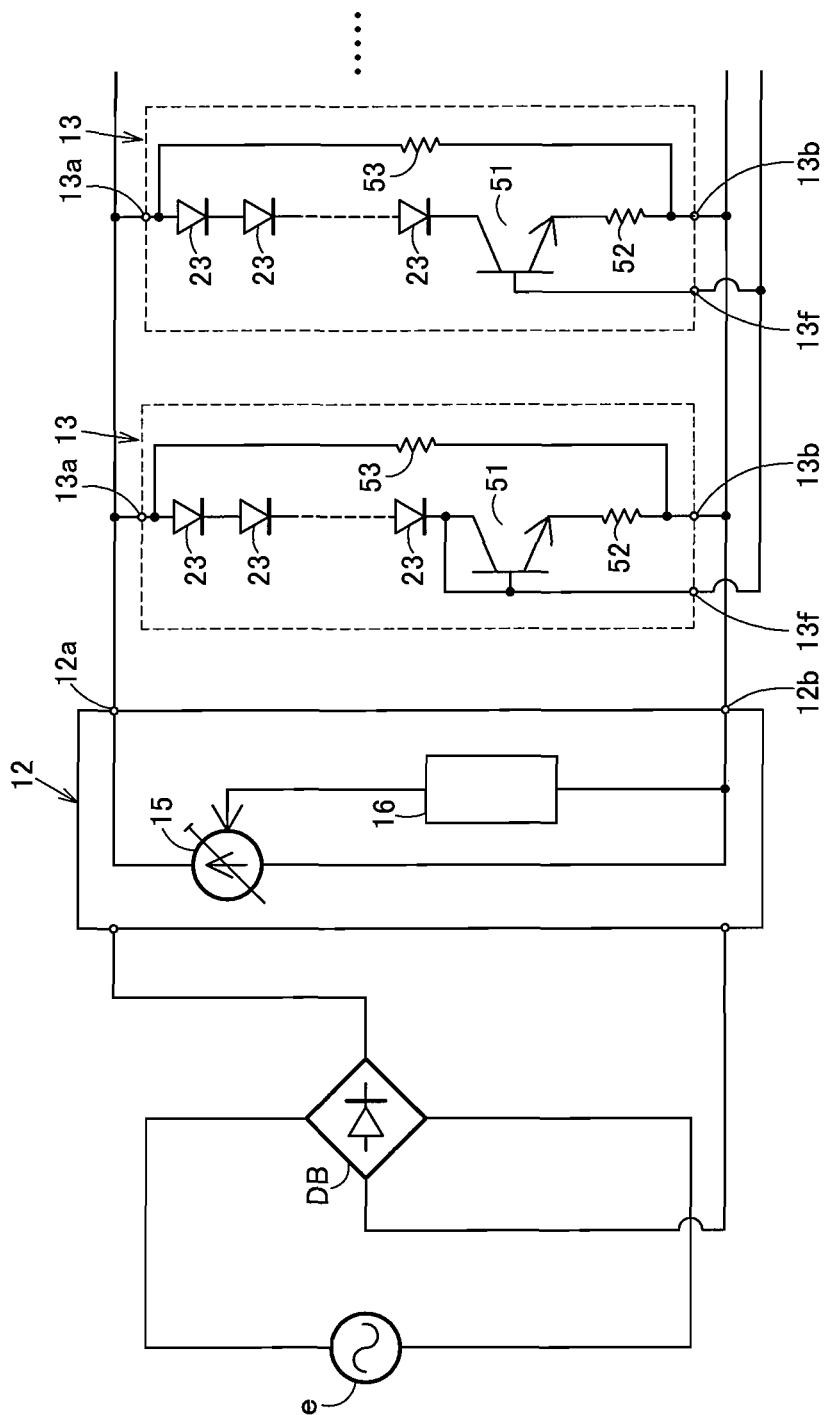
FIG. 5 is a circuit diagram of an illuminating device showing a fourth embodiment of the present invention.
Figure 6:
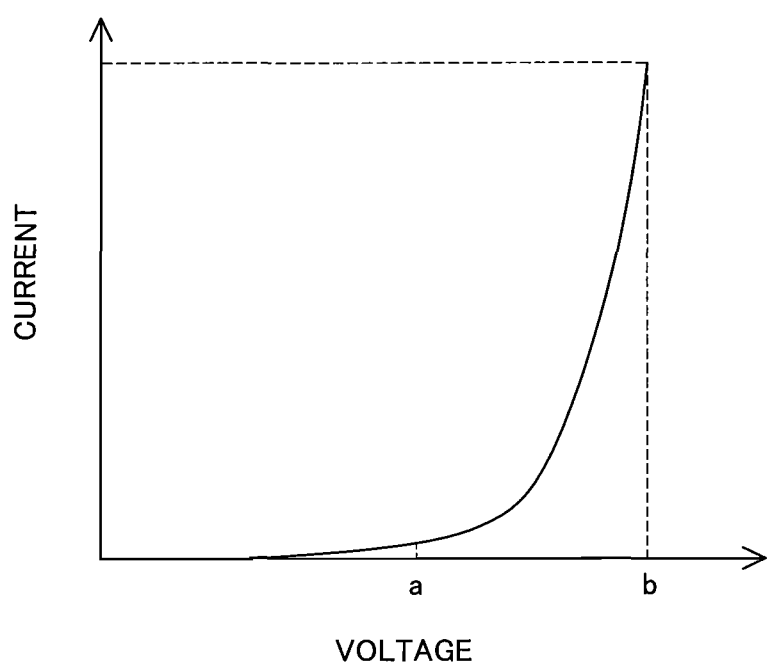
FIG. 6 is a graph showing electrical characteristics of a light source of the illuminating device.
Figure 7:
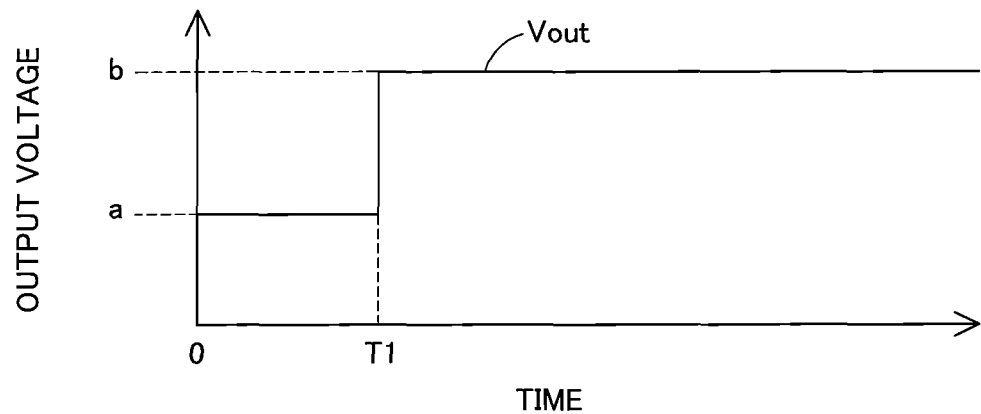
FIG. 7 is a graph showing operation of the illuminating device.

Next, a fourth embodiment is shown in FIG. 5 to FIG. 7, wherein FIG. 5 is a circuit diagram of an illuminating device, FIG. 6 is a graph showing electrical characteristics of a light source of the illuminating device, and FIG. 7 is a graph showing operation of the illuminating device. Also, the same configurations and operations as those of the abovementioned respective embodiments will be denoted with identical reference numerals, and descriptions thereof will be omitted.

For the fourth embodiment, the light emitting module 13 is formed with a series circuit of the LED 23, a transistor 51, and a resistor 52 between the main terminals 13a and 13b, and to this series circuit, an information output resistor 53 which is a resistor serving as an information unit is connected in parallel.

The transistor 51 is, for example, an NPN-type bipolar transistor, whose collector is connected to the LED 23 and whose emitter is connected to the resistor 52, and an emitter potential is set by this resistor 52. Moreover, in the transistor 51 of the first light emitting module 13 connected to the constant-current power supply 12, the collector is connected to the base. And, the bases of the transistors 51 of the respective light emitting modules 13 are connected to each other via an output terminal 13f of the light emitting module 13, and base potentials of the transistors 51 of the respective light emitting modules 13 are set to the same potential as each other. Accordingly, these transistors 51 form a leveling circuit, so that lighting currents of the LEDs 23 that flow to all light emitting modules 13 become the same current.

The information output resistor 53 is set to a sufficiently great resistance in comparison with that on the LED 23 side so that, at the time of operation of the light emitting module 13, the lighting current that flows to the LED 23 and the like can be secured.

And, the control unit 16 detects the connection information of the light emitting modules 13, here, the connecting number of the light emitting modules 13 by a current that flows through the information output resistor 53, from start-up of the LED lighting device 11, while the output voltage Vout supplied from the constant-current power supply 12 is a voltage "a" less than a lighting voltage "b" of the LED 23 shown in FIG. 6, that is, in a period up to a time T1 shown in FIG. 7.

More specifically, as a result of the number of the information output resistors 53 connected in parallel to the constant-current power supply 12 being increased or decreased due to an increase or decrease in the connecting number of the light emitting modules 13, the current value to be recognized by the control unit 16 is increased in proportion to the connecting number, so that by reading this current value, the control unit 16 detects the connecting number of the light emitting modules 13.

And, in the control unit 16, the output current I$_L$ from the variable constant-current source 15 of the constant-current power supply 12 is set in response to the connecting number of the light emitting modules 13 thus recognized, whereby drive of the LED lighting device 11 is controlled.

Thereafter, in the respective light emitting modules 13, the respective LEDs 23 are lit when the output voltage Vout supplied from the constant-current power supply 12 has reached the lighting voltage "b," and lighting of these LEDs 23 is unified in all light emitting modules 13 by a leveling effect of the resistors 52 and the transistors 51.

More specifically, the control unit 16 varies the output current I$_L$ of the constant-current power supply 12 in response to connection information outputted from the information output unit 26 provided in each of the light emitting modules 13, here, the connecting number of light emitting modules 13, whereby drive of the LED lighting device 11 can be controlled in response to a state of the connected light emitting modules 13.

Moreover, since the control unit 16 can, by reading in a period from start-up of the LED lighting device 11 up to the time T1, recognize the connection information of the light emitting modules 13 automatically in a startup sequence before the LEDs 23 of the respective light emitting modules 13 are lit after the LED lighting device 11 is started, that is, only by starting the LED lighting device 11, no time for recognizing the connection information of the light emitting modules 13 is separately required, so that usability of the LED lighting device 11 is improved.

Furthermore, since the control unit 16 recognizes a current that flows to the information output resistor 53 in a state where the voltage "a" is being applied between the main terminals 13a and 13b as connection information of the light emitting modules 13, it becomes possible to easily use the main terminals 13a and 13b of the light emitting module 13 also as the information output unit 26.

Figure 8:
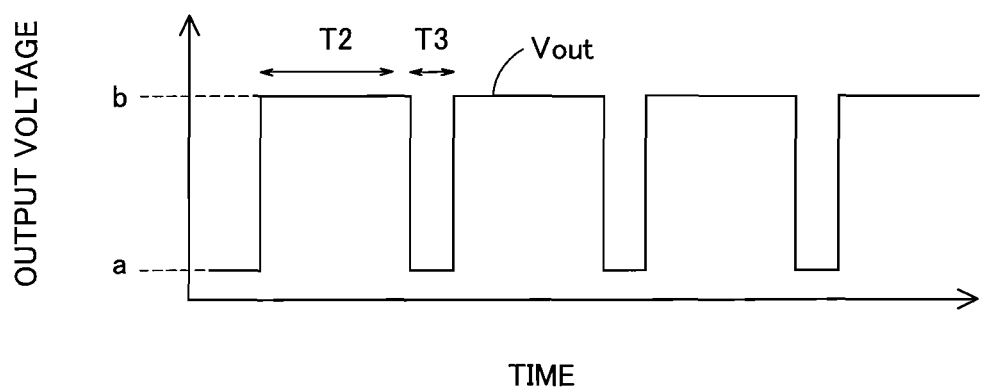
FIG. 8 is a graph showing an output voltage of a constant-current power supply of an illuminating device of a fifth embodiment of the present invention.

Next, a fifth embodiment is shown in FIG. 8, and FIG. 8 is a graph showing an output voltage of a constant-current power supply of an illuminating device. Also, since basic configurations of the LED lighting device 11 are the same as those of the abovementioned fourth embodiment, these will be denoted with identical reference numerals, and descriptions thereof will be omitted.

For the fifth embodiment, the constant-current power supply 12 is PWM (Pulse Width Modulation)-controlled. More specifically, the constant-current power supply 12 has an ON period T2 to supply a lighting voltage "b" of the LED 23 and an OFF period T3 to supply a voltage "a" lower than the lighting voltage "b" alternately, and the ratio of the ON period T2 to the OFF period T3 is set as a duty ratio. Also, the LED 23 is lit even in the OFF period T3.

And, as a result of the control unit 16 recognizing a current that flows to the information output resistor 53 due to the voltage "a" generated in the OFF period T3 of PWM control of the constant-current power supply 12 by the control unit 16, the same operations and effects as those of the abovementioned fourth embodiment can be provided, and it becomes possible to handle so-called hot plug, which allows for the attachment and removal of the light emitting module 13 while the LED lighting device 11 is on.

Moreover, since the control unit 16 recognizes the current that flows to the information output resistor 53 in the OFF period T3 of PWM control of the constant-current power supply 12, that is, in a state where the voltage "a" is being applied between the main terminals 13a and 13b as connection information of the light emitting modules 13, it becomes possible to easily use the main terminals 13a and 13b of the light emitting modules 13 also as the information output unit 26.

Also, in each of the abovementioned embodiments, it is possible to use, as the light source, an arbitrary light source other than the LED 23.

Moreover, the connection information that the light emitting module 13 outputs from the information output unit 26 can be arbitrary information besides the connecting number of light emitting modules 13 and the like.

What is claimed is:

1. An illuminating device comprising:
   a plurality of light emitting modules, each having a respective output unit of a plurality of output units, wherein each of the output units is configured to provide information indicative of a type of the corresponding light emitting module;
   a discriminating unit configured to detect one or more types of the plurality of light emitting modules based on the information from the output units; and
   a power supply configured to vary an output in accordance with a determination made by the discriminating unit regarding the one or more types of the plurality of light emitting modules.

2. The illuminating device of claim 1, wherein the information indicative of the type of the light emitting modules includes an output voltage.

3. The illuminating device of claim 2, wherein the discriminating unit is configured to detect the one or more types of the light emitting modules based on the output voltage.

4. The illuminating device of claim 1, wherein each of the output units includes a corresponding pulse power supply.

5. The illuminating device of claim 1, wherein the plurality of light emitting modules are connected to a common output terminal of the power supply.

6. The illuminating device of claim 1, wherein the illuminating device is configured to be operable with a plurality of types of light emitting modules.

7. The illuminating device of claim 1, wherein the discriminating unit is a load fitting state discriminating unit.

8. The illuminating device of claim 1, wherein the power supply is connected to only one of the plurality of light emitting modules.

9. A method comprising:
   determining, by an illuminating device having a plurality of connected light emitting modules, information indicative of a type of the plurality of connected light emitting modules based on information from a respective output unit of each of the light emitting modules;
   determining, by a discriminating unit of the illuminating device, one or more types of the plurality of connected light emitting modules based on the information from the respective output units; and
   modifying, by the illuminating device, an output of a power supply based on the determined one or more types of the connected light emitting modules.

10. The method of claim 9, wherein determining the one or more types of the connected light emitting modules is performed based on an output voltage associated with one or more of the light emitting modules.

11. The method of claim 9, wherein the power supply is connected to only one of the plurality of light emitting modules.

12. A method comprising:
    determining, by an illuminating device having a connected light emitting module, information indicative of a type of the connected light emitting module from an output unit of the connected light emitting module,
    determining, by a discriminating unit of the illuminating device, the type of the connected light emitting module based on the information from the output unit; and
    modifying, by the illuminating device, an output of a power supply based on the determined type of the connected light emitting module,
    wherein determining the type of the connected light emitting module is performed based on a frequency of increases or decreases in an output voltage associated with the light emitting module.

13. The method of claim 12, further comprising:
    determining a number of light emitting modules connected in the illuminating device based on the output voltage; and
    modifying the output of the power supply based on the determined number of light emitting modules connected in the illuminating device.

14. A lighting apparatus comprising:
    a light emitting module having an output unit, wherein the output unit is configured to provide information indicative of a type of the light emitting module, the information including a frequency of increases or decreases in an output voltage associated with the light emitting module;
    a discriminating unit configured to detect the type of the light emitting module based on the information from the output unit; and
    a power supply configured to vary an output in accordance with a determination made by the discriminating unit regarding the type of the light emitting module.

* * * * *